(12) United States Patent
Cheng

(10) Patent No.: US 9,849,812 B2
(45) Date of Patent: Dec. 26, 2017

(54) CHILD SAFETY SEAT ASSEMBLY

(71) Applicant: Wonderland Nurserygoods Company Limited, Kwai Chung, N.T. (HK)

(72) Inventor: Chin Ming Cheng, Kwai Chung (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 180 days.

(21) Appl. No.: 14/975,989

(22) Filed: Dec. 21, 2015

(65) Prior Publication Data

US 2016/0200223 A1   Jul. 14, 2016

Related U.S. Application Data

(62) Division of application No. 14/158,508, filed on Jan. 17, 2014, now Pat. No. 9,242,584.

(51) Int. Cl.
*B60N 2/28* (2006.01)

(52) U.S. Cl.
CPC ......... *B60N 2/2809* (2013.01); *B60N 2/2824* (2013.01); *B60N 2/2872* (2013.01); *B60N 2/2884* (2013.01); *B60N 2/2887* (2013.01)

(58) Field of Classification Search
CPC .. B60N 2/2809; B60N 2/2824; B60N 2/2872; B60N 2/2884
USPC .......... 297/250.1, 253, 254, 216.11
See application file for complete search history.

(56) References Cited

U.S. PATENT DOCUMENTS

| | | | | |
|---|---|---|---|---|
| 3,544,158 A * | 12/1970 | Timms | ................. | B60N 2/2809 280/202 |
| 3,649,074 A * | 3/1972 | McDonald | ............. | A47D 1/002 297/130 |
| 3,861,742 A * | 1/1975 | Leonard | ............... | B60N 2/2839 297/216.11 |
| 8,973,987 B2 * | 3/2015 | Mo | ...................... | B60N 2/2824 297/216.11 |
| 2006/0055218 A1 * | 3/2006 | Barker | ................. | B60N 2/2803 297/250.1 |
| 2006/0163922 A1 * | 7/2006 | Flannery | .................. | A47D 1/02 297/250.1 |
| 2007/0069562 A1 * | 3/2007 | Van Montfort | ...... | B60N 2/2893 297/253 |
| 2008/0303321 A1 * | 12/2008 | Powell | ................. | B60N 2/2824 297/216.11 |
| 2008/0315647 A1 * | 12/2008 | Carine | ................. | B60N 2/2824 297/250.1 |

(Continued)

*Primary Examiner* — Syed A Islam
(74) *Attorney, Agent, or Firm* — Baker & McKenzie LLP; David I. Roche

(57) ABSTRACT

A child safety seat assembly includes a shell body for defining a support base attachable to a child seat, a leg frame extendible downward from a bottom of the shell body, and a cushion part. The leg frame includes a first and a second tube segment attached with each other, the first tube segment being affixed with a fastener. The cushion part is affixed in the second tube segment adjacent to the fastener, and is formed as an integral hollow body including a first, a second and a third sidewall. The first sidewall faces the fastener, and the second and third sidewalls include inward recessed surfaces and are respectively connected with two side edges of the first sidewall. When the second tube segment is forced to displace relative to the first tube segment, the fastener and the first sidewall push against each other to cause deformation of the cushion part.

12 Claims, 18 Drawing Sheets

(56) References Cited

U.S. PATENT DOCUMENTS

| | | | |
|---|---|---|---|
| 2009/0184549 A1* | 7/2009 | Kassai | B60N 2/2824 297/256.1 |
| 2010/0052384 A1* | 3/2010 | Yang | B60N 2/2824 297/253 |
| 2014/0001800 A1* | 1/2014 | Mo | B60N 2/2884 297/216.11 |
| 2015/0091343 A1* | 4/2015 | Cheng | B60N 2/2821 297/216.11 |

* cited by examiner

CHILD SAFETY SEAT ASSEMBLY

CROSS-REFERENCE TO RELATED APPLICATION(S)

This application is a Divisional Patent Application of U.S. patent application Ser. No. 14/158,508 filed on Jan. 17, 2014, which claims priority to U.S. Provisional Patent Application No. 61/753,954 filed on Jan. 18, 2013, the disclosures of which are incorporated herein by reference.

BACKGROUND

1. Field of the Invention

The present invention relate to child safety seat assemblies.

2. Description of the Related Art

Current safety regulations require the use of a child safety seat to seat a young child in a vehicle for protecting the child during crash collision. In particular, when it is installed in a car, the child safety seat may have rear anchor latches that can attach to an anchorage fixture provided at the rear passenger's seat. Moreover, some child safety seats may further include a top tether assembled with the seatback of the child safety seat, and a support leg at the bottom of its base. The anchor latches, the top tether and the support leg can provide different points of attachment and abutment to restrict movement of the child safety seat so that it can protect a child when car collision occurs.

However, the aforementioned attachment is usually designed to provide a tight hold of the child safety seat, and the energy resulting from a crash collision may be substantially transmitted to the child and cause injury: for example, excessive pressure applied by the restraint harness of the child safety seat may cause injuries at the neck and chest of the child. In case of violent collision, rupture of the top tether may even happen, which may cause flipping of the child safety seat.

Therefore, there is a need for a child safety seat that is safer in use, and can address at least the aforementioned issues.

SUMMARY

The present application describes child safety seat assemblies including cushion parts that can dissipate a part of the collision energy when car collision occurs. In one embodiment, the child safety seat assembly includes a shell body for defining a support base attachable to a child seat, a leg frame coupled with the shell body and operable to extend downward from a bottom of the shell body, and a cushion part. The leg frame includes a first and a second tube segment attached with each other, the first tube segment being further affixed with a fastener. The cushion part is affixed in the second tube segment adjacent to the fastener, and is formed as an integral hollow body including a first, a second and a third sidewall. The first sidewall faces the fastener, and the second and third sidewalls respectively include inward recessed surfaces and are respectively connected with two side edges of the first sidewall. When the second tube segment and the cushion part are forced to displace in unison relative to the first tube segment and the fastener, the fastener and the first sidewall push against each other to cause deformation of the cushion part.

In another embodiment, the child safety seat assembly includes a shell body, a leg frame coupled with the shell body and operable to extend downward from a bottom of the shell body, and a cushion part. The leg frame includes a first and a second tube segment attached with each other, the first tube segment being further affixed with a fastener. The cushion part is affixed in the second tube segment adjacent to the fastener, and is formed as an integral hollow body having an inner cavity. The hollow body includes two opposite end portions, and a first, a second and a third sidewall respectively extending between the two end portions, the first sidewall facing the fastener, and the second and third sidewalls respectively including inward recessed surfaces and being respectively connected with two side edges of the first sidewall. When the second tube segment and the cushion part are forced to displace in unison relative to the first tube segment and the fastener, the fastener and the first sidewall push against each other to cause bending deformation of the first sidewall toward the inner cavity.

DETAILED DESCRIPTION OF THE EMBODIMENTS

The present application describes child safety seat assemblies that include a support base, and a child seat arranged on the support base. The support base and/or the child seat can include an anchor latch that can attach to an anchorage fixture provided in a vehicle to prevent movement of the child safety seat assembly relative to a passenger's seat. In one embodiment, the support base and/or the child seat can include a cushioning structure that is assembled adjacent to the anchor latch and includes a cushion part and a fastener. The cushion part can have a hollow body integrally formed in a single piece that has a first, a second and a third sidewall, the second and third walls respectively having inward recessed surfaces and being connected with two opposite edges of the first sidewall. The cushion part is arranged such that the first sidewall adjacently faces the fastener. When car collision occurs, the cushion structure is operable to allow a cushioned displacement relative to the anchor latch.

Figure 1:
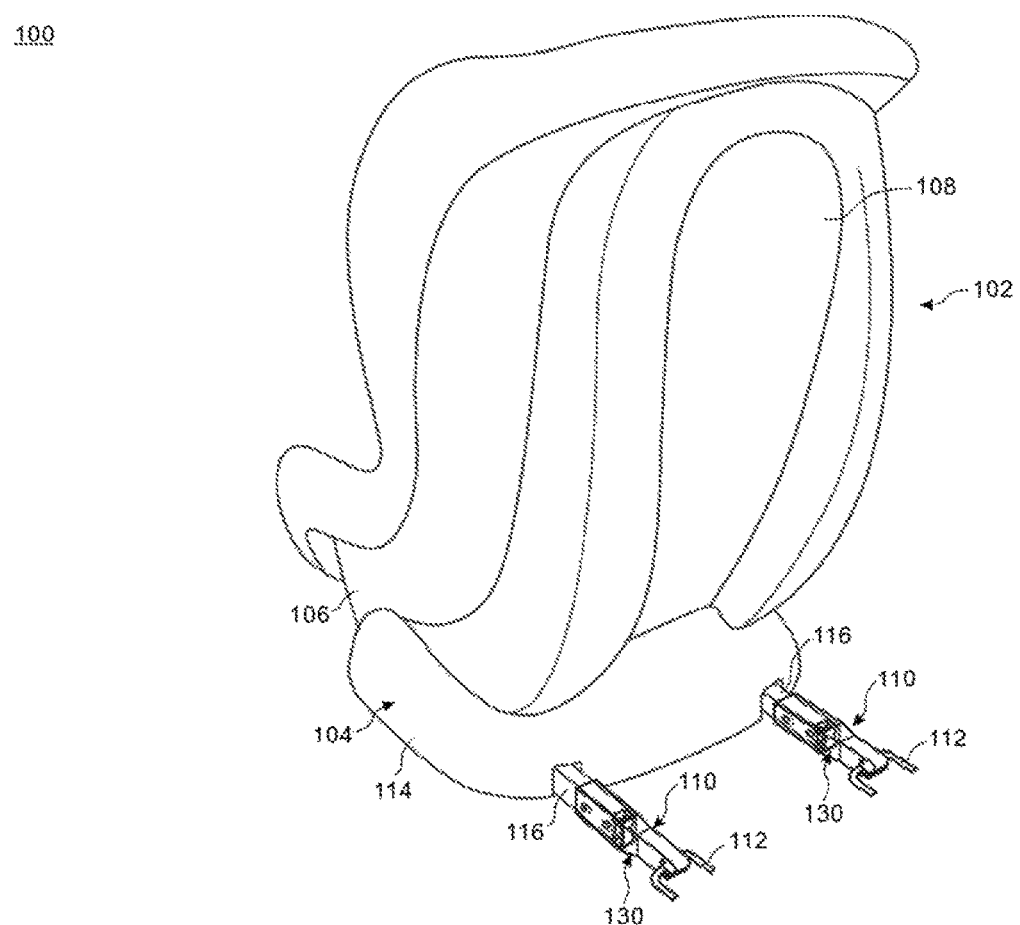
FIG. 1 is a schematic view illustrating an embodiment of a child safety seat assembly.

FIG. 1 is a schematic view illustrating an embodiment of a child safety seat assembly 100. The child safety seat assembly 100 can include a child seat 102 and a support base 104. The child seat 102 can be detachably assembled with the support base 104, and can include a seat portion 106 and a backrest portion 108 that define a comfortable and safe seating space. The support base 102 can include a plurality of anchor latches 110 that can fasten to an anchorage fixture 112 of a vehicle. Once the child seat 102 is installed on the support base 104, the support base 104 can provide stable support on a vehicle seat, and the anchor latches 110 can engage with the anchorage fixture 112 to restrict displacement of the child safety seat assembly 100.

Figure 2:
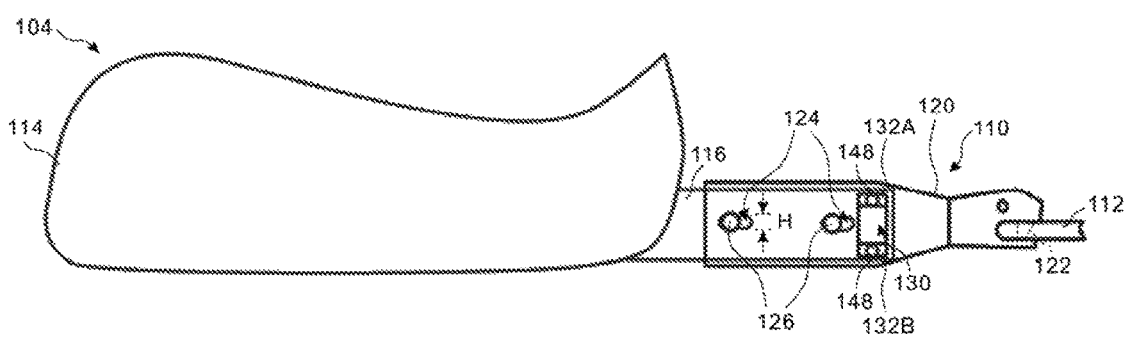
FIG. 2 is a schematic view illustrating the assembly of an anchor latch with a support base in the child safety seat assembly shown in FIG. 1.

FIG. 2 is a schematic view illustrating the assembly of the anchor latch 110 with the support base 104. The support base 104 can include a shell body 114 to which are assembled two extension arms 116 and two anchor latches 110. The shell body 114 can be exemplary formed by plastic molded parts. The extension arms 116 can be constructed as tubular structures, and can be assembled at a rear of the support base 104 transversally spaced apart from each other. Each of the extension arm 116 can have a first end portion connected with the shell body 114, and a second end portion extending rearward from support base 104 and affixed with one anchor latch 110. In some embodiment, the extension arms 116 can also be movable forth and back relative to the shell body 114 to adjust a distance between the anchor latches 110 and the rear of the shell body 114.

Each of the anchor latches 110 can be affixed with the corresponding extension arm 116. Each anchor latch 110 can include a frame 120 and a fastening mechanism 122 (shown with phantom lines in FIG. 2) assembled with each other. The fastening mechanism 122 can exemplary include a hook that can engage with the anchorage fixture 112.

For assembling the extension arm 116 with the anchor latch 110, the extension arm 116 can include a slot 124 having an elongated shape. For example, the slot 124 can be formed through the tubular structure of the extension arm 116, and can extend along a longitudinal axis of the extension arm 116. A fastener 126 can be engaged through the frame 120 of the anchor latch 110 and the slot 124 of the extension arm 116 to affix the frame 120 with the tubular structure of the extension arm 116. Examples of the fastener 126 can include a rivet or bolt.

In one embodiment, the fastener 126 can be tightly engaged through the slot 124 of the extension arm 116: for example, a height H of the slot 124 can be substantially equal to or slightly smaller than a width of the fastener 126. Accordingly, the fastener 126 can be affixed with the extension arm 116 once it engages through the slot 124. Owing to the elongated shape of the slot 124, the occurrence of car collision can force the fastener 126 in the child safety seat assembly 100 to move along the slot 124 and press against a cushion part 130. The assembly and interaction of the cushion part 130 with the fastener 126 can provide a cushioning structure adjacent to each anchor latch 110 of the child safety seat assembly 100.

Figure 3:
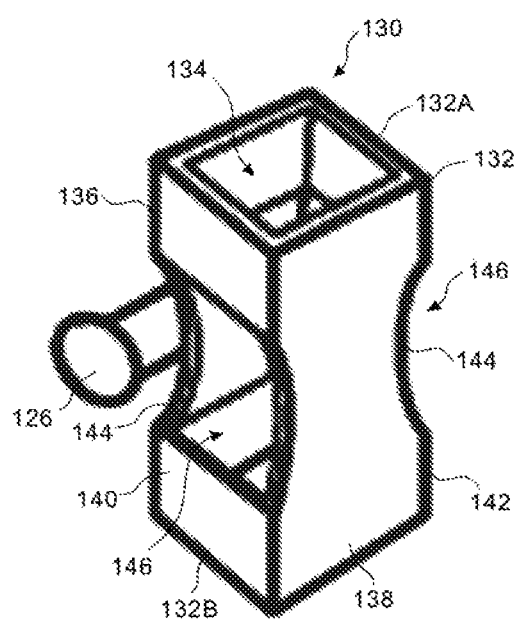
FIG. 3 is a schematic view illustrating the construction of a cushion part in the support base shown in FIG. 2.

FIG. 3 is a schematic view illustrating the construction of the cushion part 130. The cushion part 130 can have a hollow body 132 formed integrally in a single piece. The hollow body 132 can include an inner cavity 134 that extends from a first end portion 132A to a second end portion 132B of the hollow body 132. Moreover, the hollow body 132 can include a plurality of sidewalls, such as 4 sidewalls 136, 138, 140, 142. The sidewalls 136, 138, 140, 142 can surround the inner cavity 134, and extend from the first end portion 132A to the second end portion 132B of the hollow body 132. The sidewalls 136 and 138 are located at two opposite sides of the inner cavity 134, and the sidewalls 140 and 142 are located at two other opposite sides of the inner cavity 134 and respectively connect with two opposite side edges of the sidewalls 136 and 138. The cushion part 130, including the hollow body 132 and the sidewalls 136, 138, 140, 142, can be made of a metallic material or plastics material.

It will be appreciated that the cushion part is not limited to the aforementioned shape having 4 sidewalls, and may have other shapes, such as a triangular shape, a polygonal shape having 5 sidewalls, a hexagonal shape, a cylindrical shape, etc.

The sidewalls 140 and 142 can include inward recessed surfaces 144 symmetrical to each other. The inward recessed surface 144 can be arranged in a middle region of each of the sidewalls 140 and 142 between the two end portions 132A and 132B of the hollow body 132. As shown in FIG. 3, the inward recessed surface 144 can have an arc shape, which can prevent the occurrence of cracks induced by a stress concentration when the cushion part 130 is subject to deformation. The occurrence of such cracks may affect the ability of the cushion part 130 to absorb collision energy. Moreover, each of the sidewalls 140 and 142 can further include an opening 146 formed through the inward recessed surface 144 and communicating with the inner cavity 134. The inner cavity 134, inward recessed surfaces 144 and openings 146 may be configured to allow the cushion part 130 to plastically deform for absorbing collision energy.

The cushion part 130 can be affixed in the extension arm 116 adjacent to the fastener 126. In one embodiment, the cushion part 130 can be affixed vertically in the extension arm 116, i.e., the end portions 132A and 132B are arranged along a vertical direction. Fasteners 148 can be respectively engaged through the extension arm 116 and end portions 132A and 132B of the cushion arm 130 to fixedly assemble the cushion arm 130 with the extension arm 116. When the cushion part 130 is fixedly assembled, the sidewall 136 can face the fastener 126.

Figure 4:
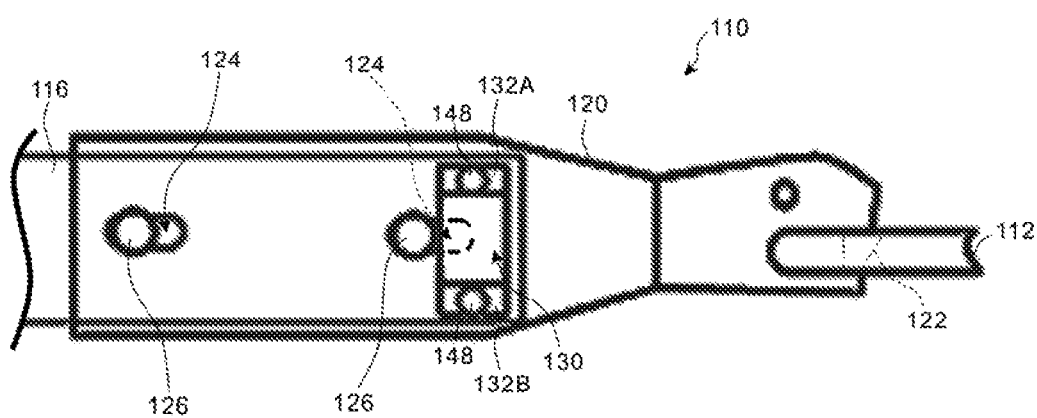
FIG. 4 is a schematic view illustrating another embodiment of assembling the cushion part in the support base.

Referring to FIG. 4, one variant embodiment may have the cushion part 130 affixed in the extension arm 116 at a position that partially overlaps with the slot 124, the cushion part 130 being in contact with the fastener 126 (i.e., the sidewall 136 contacting with the fastener 126). In this configuration, the cushion part 130 can assist to affix the fastener 126 in place for attaching the extension arm 116 with the anchor latch 110.

The assembly of the cushion part 130 as described previously may be similar in each of the two extension arms 116.

Figure 5:
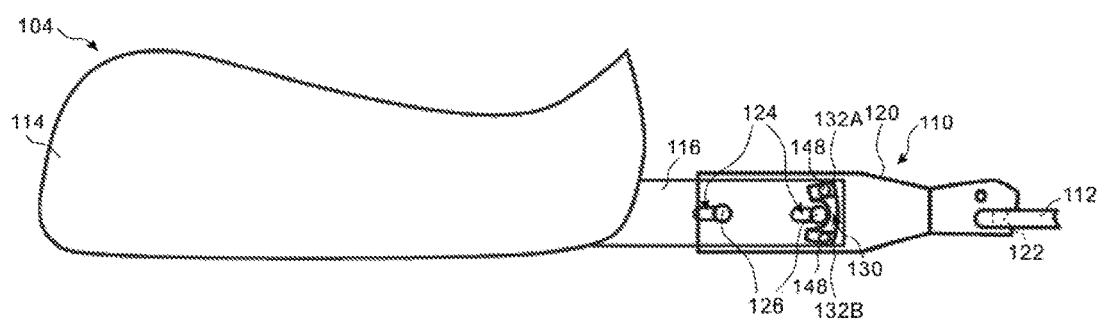
FIGS. 5 and 6 are schematic views illustrating a cushioning action of the cushion part.
Figure 6:
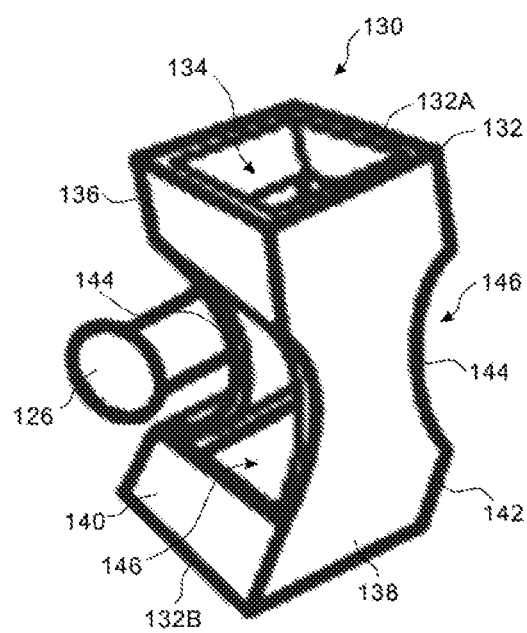

FIGS. 5 and 6 are schematic views illustrating a cushioning action of the cushion part 130. When a vehicle installed with the child safety seat assembly 100 is subject to collision, each of the extension arms 116 can be urged to move relative to the anchor latch 110 and the fastener 126 assembled thereto. As a result, the fastener 126 can be urged to move in unison with the anchor latch 110 along the slot 124 relative to the cushion part 130 and the extension arm 116, which causes the fastener 126 and the sidewall 136 to push against each other. The cushion part 130 thereby plastically deforms, which results in a cushioning displacement of the extension arm 116 relative to the anchor latch 110. The region where the fastener 126 contacts and pushes against the sidewall 136 can be located at the middle of the hollow body 132 between the two end portions 132A and 132B, and more particularly adjacent to the inward recessed surfaces 144 of the sidewalls 140 and 142. The pressure applied by the fastener 126 can cause the sidewall 136 to bend inward the inner cavity 134 of the hollow body 132, which can dissipate a portion of the collision energy and reduce the risk of injuries to the child sitting on the child safety seat assembly 100.

It is worth noting that more cushion parts 130 may be assembled in each extension arm 116 to increase the cushioning effects. When collision occurs, the multiple cushion parts 130 may be pushed against one or more fastener 126 to produce a cushioned displacement of the extension arms 116 relative to the anchor latches 110.

Figure 7:
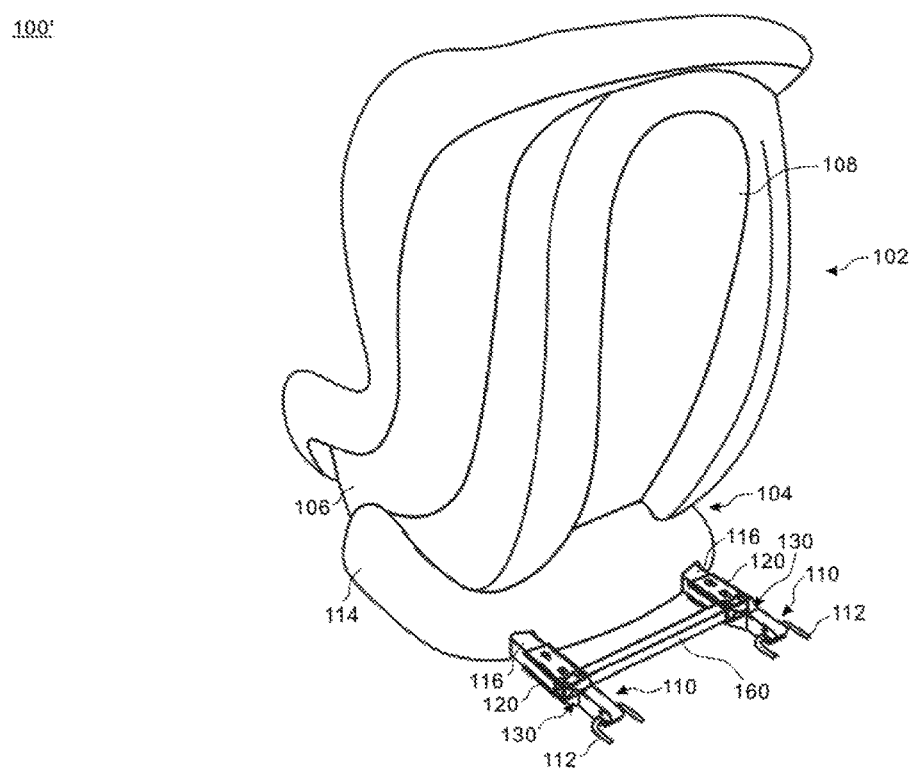
FIG. 7 is a schematic view illustrating another embodiment of a child safety seat assembly.
Figure 8:
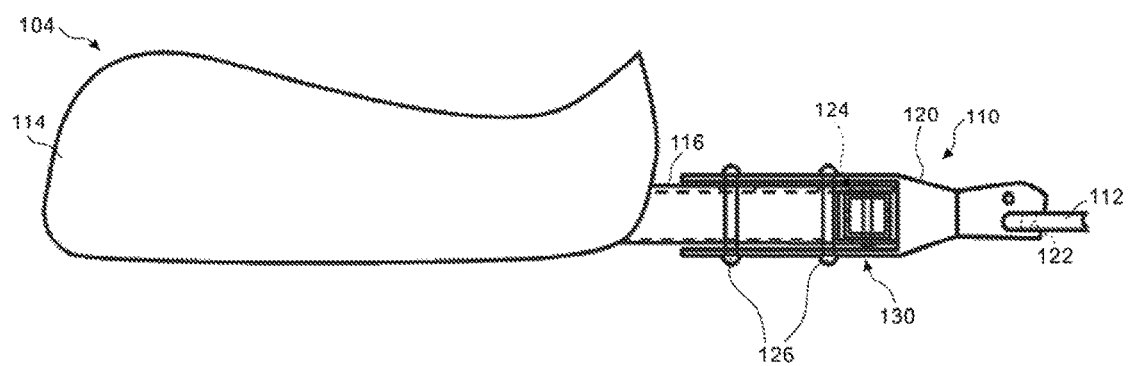
FIG. 8 is a schematic view illustrating a cushion part provided in the child safety seat assembly shown in FIG. 7.
Figure 9:
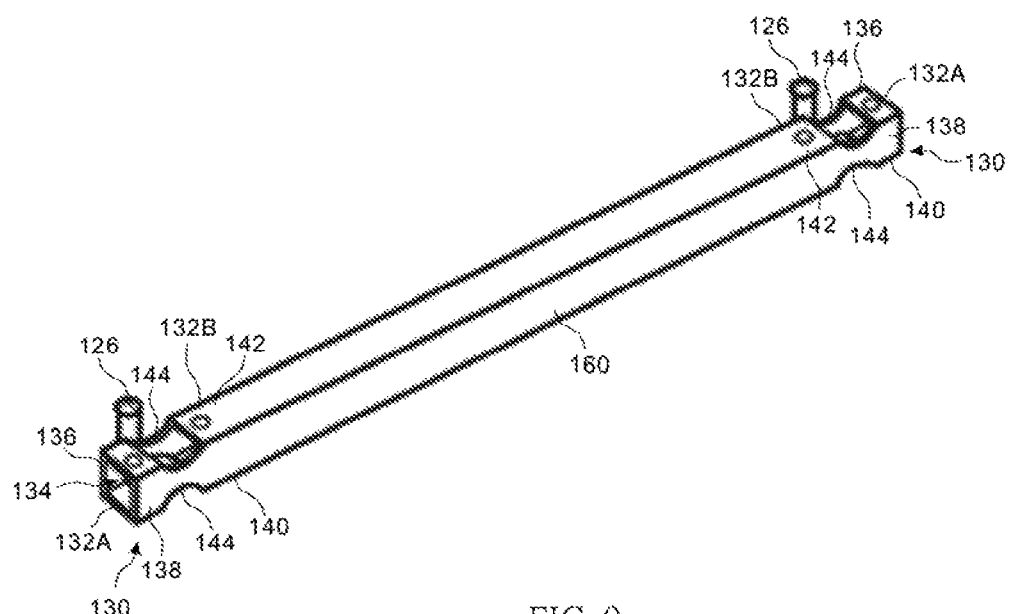
FIG. 9 is a schematic view illustrating the cushion part shown in FIG. 8.

FIGS. 7-9 are schematic views illustrating a variant embodiment of a child safety seat assembly 100'. The child safety seat assembly 100' can have a construction similar to the embodiment described previously. However, the child safety seat assembly 100' may additionally include a transversal bar 160 disposed between the two extension arms 116. The transversal bar 160 can extend transversally, and have two opposite end portions respectively connected with the cushion parts 130 in the two extension arms 116. In one embodiment, the transversal bar 160 and the two cushion parts 130 can be formed integrally in a single piece. Moreover, this embodiment can have each cushion part 130 respectively arranged in a horizontal position in the corresponding extension arm 116, i.e., the attachment points of the end portions 132A and 132B can be distributed horizontally.

Figure 10:
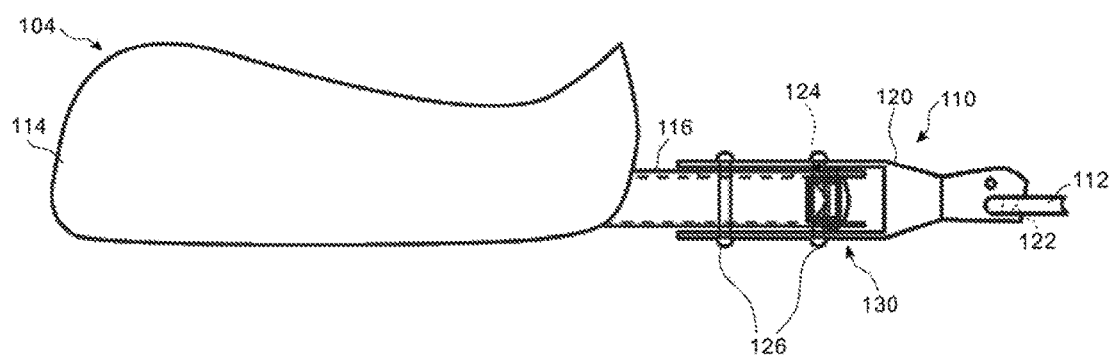
FIGS. 10 and 11 are schematic views illustrating a cushioning action of the cushion part shown in FIG. 9.
Figure 11:
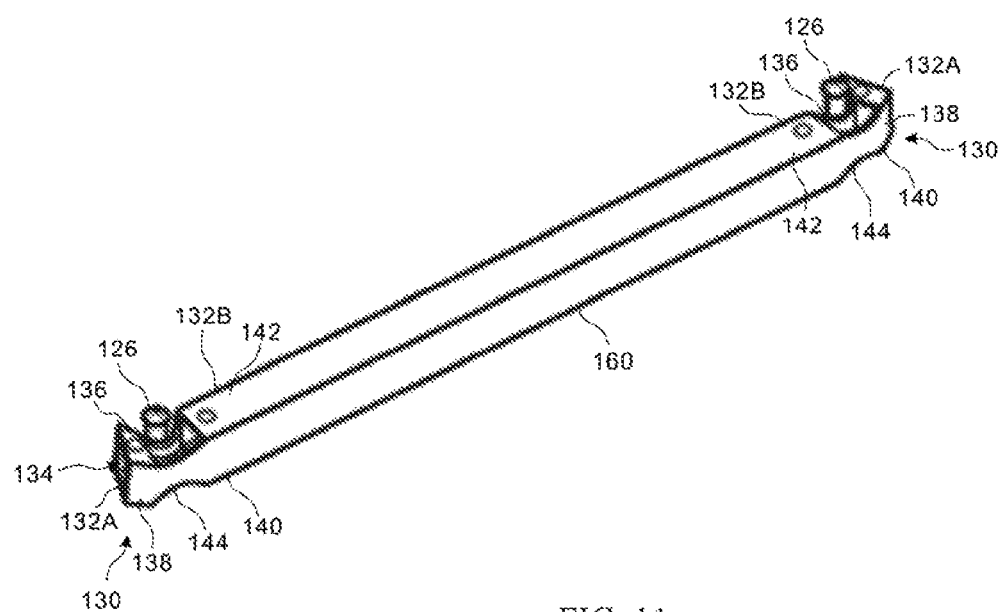

FIGS. 10 and 11 are schematic views illustrating a cushioning action of the cushion parts 130 in the embodiment of FIG. 7. When a vehicle installed with the child safety seat assembly 100' is subject to collision, each of the extension arms 116 can be urged to move relative to the anchor latch 110 and fastener 126 assembled thereto. As a result, the fastener 126 can be urged to move in unison with the anchor latch 110 along the slot 124 relative to the cushion part 130 and the extension arm 116, which causes the fastener 126 and the sidewall 136 to push against each other. The cushion part 130 thereby plastically deforms, which results in a cushioning displacement of the extension arm 116 relative to the anchor latch 110. The region where the fastener 126 contacts and pushes against the sidewall 136 can be located at the middle of the hollow body 132 between the two end portions 132A and 132B, and more particularly adjacent to the inward recessed surfaces 144 of the sidewalls 140 and 142. The pressure applied by the fastener 126 can cause the sidewall 136 to bend inward the inner cavity 134 of the hollow body 132, which can dissipate a portion of the collision energy and reduce the risk of injuries to the child sitting on the child safety seat assembly 100.

In the embodiment shown in FIGS. 7-11, owing to connection between the transversal bar 160 and the two cushion parts 130, the transversal bar 160 can be grasped to position the two cushion parts 130 in or remove them from the extension arms 116 in a concurrent manner. Accordingly, assembly and removal of the two cushion parts 130 can be facilitated.

Figure 12:
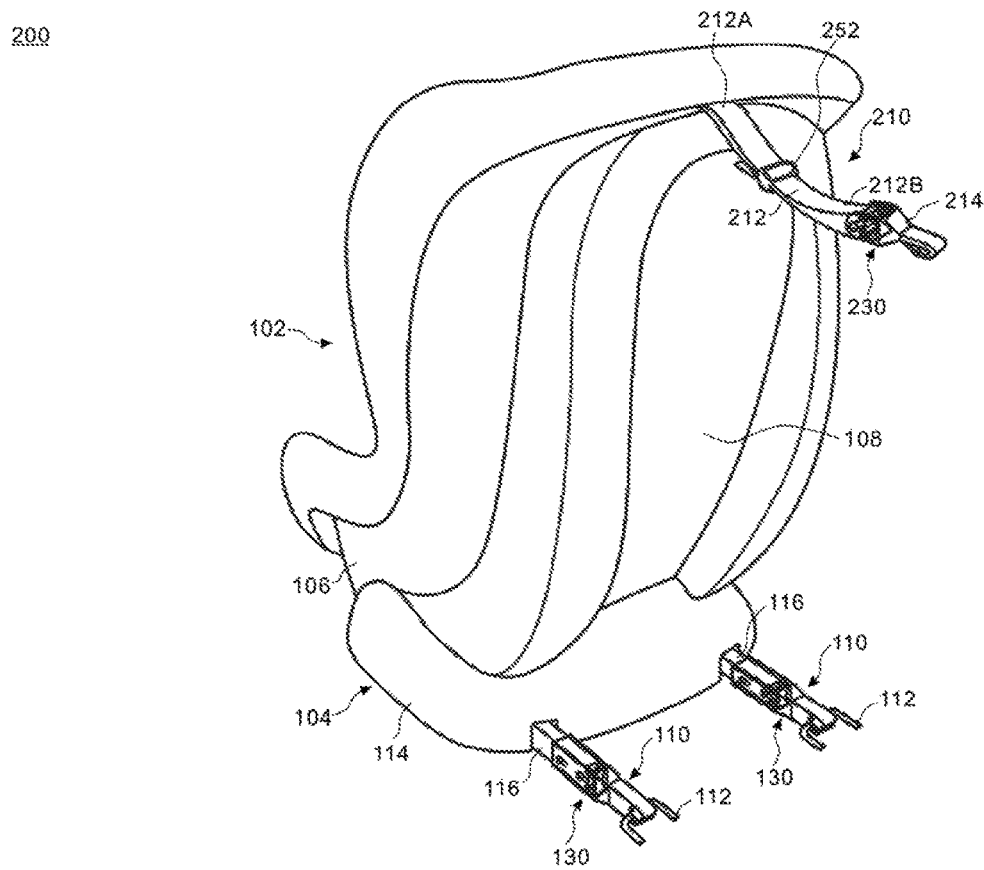
FIG. 12 is a schematic view illustrating another variant embodiment of a child safety seat assembly.

FIG. 12 is a schematic view illustrating another embodiment of a child safety seat assembly 200. Like the embodiment of FIG. 1, the child safety seat assembly 200 can include the child seat 102 and the support base 104. The support base 104 can include two extension arms 116 respectively assembled with two anchor latches 110. When the child safety seat assembly 200 is installed on a vehicle seat, the anchor latches 110 can engage with the anchorage fixture 112 to restrict displacement of the child safety seat assembly 200. Moreover, the extension arms 116 of the child safety seat assembly 200 can be respectively assembled with cushion parts 130 that allow cushioned displacement of the extension arms 116 and the support base 104 relative to the anchor latches 110. The cushion parts 130 can be similar to the embodiment described in FIGS. 2-6.

Moreover, the child safety seat assembly 200 can further include an anchoring tether 210 connected with an upper portion of the backrest portion 108 of the child seat 102. When the child safety seat assembly 200 is installed on a vehicle seat, the anchoring tether 110 can engage with a fixed anchorage of the vehicle (not shown) so as to prevent displacement or flipping of the child safety seat assembly 200 when car collision occurs. In one embodiment, the anchoring tether 210 can include a strap assembly 212, an anchor latch 214 and a cushion part 230.

Figure 13:
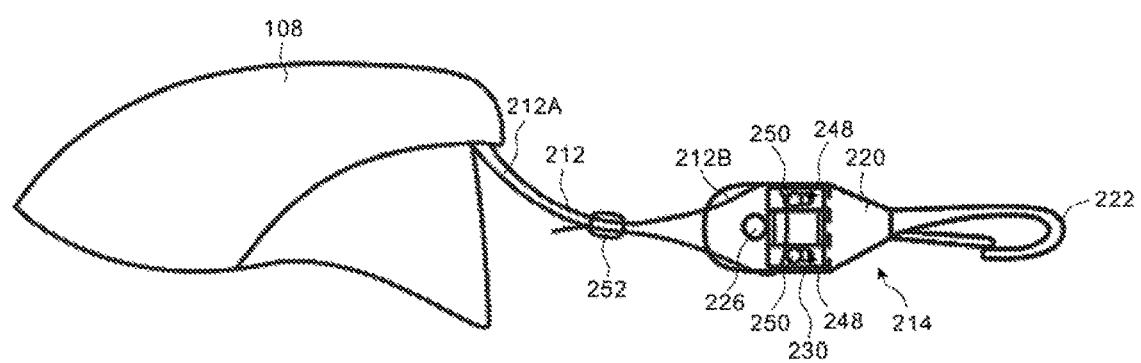
FIGS. 13 and 14 are schematic views illustrating the assembly of an anchor latch, a strap assembly and a cushion part in the child safety seat assembly shown in FIG. 12.
Figure 14:
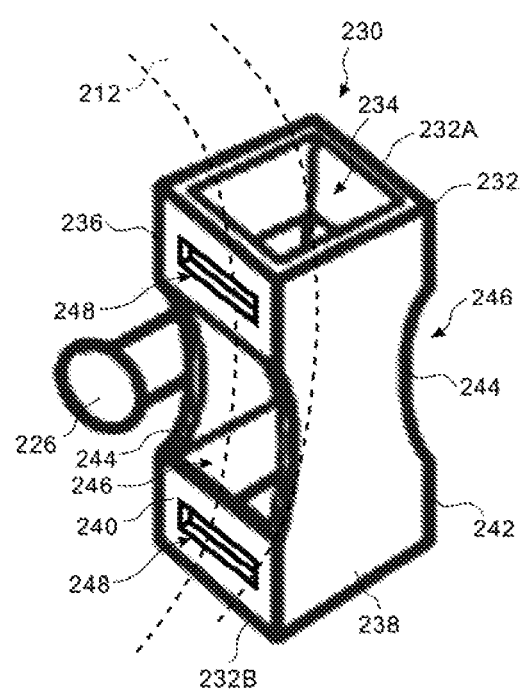

FIGS. 13 and 14 are schematic views illustrating the construction of the anchoring tether 210 in more details. The anchor latch 214 can include a frame 220 and fastening mechanism 222 assembled with each other. The fastening mechanism 222 can exemplary include a hook that can engage with a fixed anchorage of the vehicle. The anchor latch 214 can be affixed with a fastener 226 and the cushion part 230. Examples of the fastener 226 can include a rivet or bolt. The cushion part 230 can be affixed in an interior of the anchor latch 214 adjacent to the fastener 226.

Referring to FIG. 14, the cushion part 230 can be similar to the cushion part 130 in structure. More specifically, the cushion part 230 can have a hollow body 232 formed integrally in a single piece. The hollow body 232 can include an inner cavity 234 that extends from a first end portion 232A to a second end portion 232B of the hollow body 232. Moreover, the hollow body 232 can include a plurality of sidewalls 236, 238, 240, 242. The sidewalls 236, 238, 240, 242 can surround the inner cavity 34, and extend from the first end portion 232A to the second end portion 232B of the hollow body 232. The sidewalls 236 and 238 are located at two opposite sides of the inner cavity 234, and the sidewalls 240 and 242 are located at two other opposite sides of the inner cavity 234 and respectively connect with two opposite side edges of the sidewalls 236 and 238. The cushion part 230, including the hollow body 232 and the sidewalls 236, 238, 240, 242, can be made of a metallic material or plastics material.

The sidewalls 240 and 242 can respectively include inward recessed surfaces 244 symmetrical to each other. The inward recessed surface 244 can be arranged in a middle region on each of the sidewalls 240 and 242 between the two end portions 232A and 232B. Moreover, each of the sidewalls 240 and 242 can further include an opening 246 formed through the inward recessed surface 244 and communicating with the inner cavity 234.

The cushion part 230 can be affixed in the anchor latch 214 at a position adjacent to the fastener 226. For example, each of the two end portions 232A and 232B can respectively include a slot 248, and fasteners 250 can respectively engage through the slots 248 to affix the cushion part 230 with the anchor latch 214. Once the cushion part 230 is fixedly assembled in the anchor latch 214, the sidewall 236 can face the fastener 226.

The strap assembly 212 can have a first end portion 212A connected with the backrest portion 108, and a second end portion 212B connected with the cushion part 230. In particular, the second end portion 212B can pass through the inner cavity 234 and wrap around the cushion part 230. Moreover, the strap assembly 212 can further include a length adjusting member 252 for changing a strap length between the first end portion 212A and the anchor latch 214.

Figure 15:
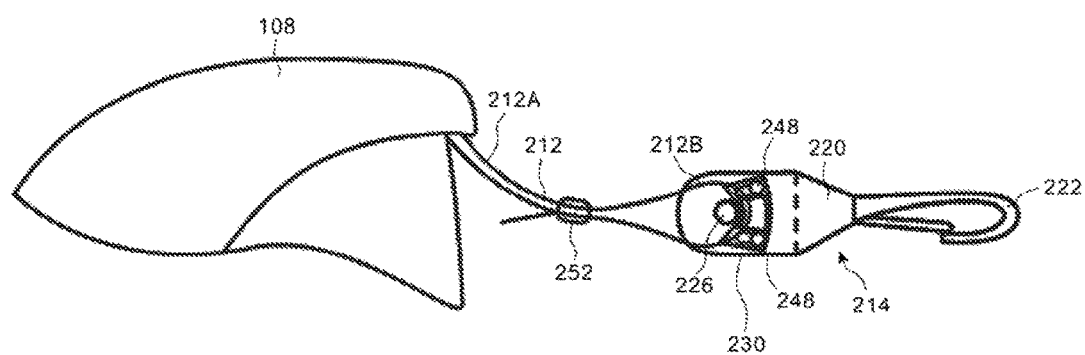
FIG. 15 is a schematic view illustrating a cushioning action of the cushion part shown in FIG. 14.

FIG. 15 is a schematic view illustrating a cushioning action of the cushion part 230. When a vehicle installed with the child safety seat assembly 200 is subject to collision, the strap assembly 212 can be pulled and tensioned by the child safety seat assembly 200. As a result, the strap assembly 212 can apply a pulling force on the cushion part 230, which urges the cushion part 230 to move relative to the anchor latch 214 toward the fastener 226. Owing to the displacement of the cushion part 230, the fastener 250 may move along the slots 248. Consequently, the fastener 226 and the sidewall 236 of the cushion part 230 are pushed against each other, and the cushion part 230 plastically deforms resulting in a cushioning displacement of the strap assembly 212 relative to the anchor latch 214. The region where the fastener 226 contacts and pushes against the sidewall 236 can be located at the middle of the hollow body 232 between the two end portions 232A and 232B, and more particularly adjacent to the inward recessed surfaces 244 of the sidewalls 240 and 242. The pressure applied by the fastener 226 can cause the sidewall 236 to bend inward the inner cavity 234 of the hollow body 232, which can dissipate a portion of the collision energy and reduce the risk of injuries to the child sitting on the child safety seat assembly 200.

It is worth noting that more cushion parts 230 may be assembled with the anchor latch 214 to increase the cushioning effects. When collision occurs, the multiple cushion parts 20 may be pushed against one or more fastener 226 to produce a cushioned displacement of the strap assembly 212 relative to the anchor latches 214.

Figure 16:
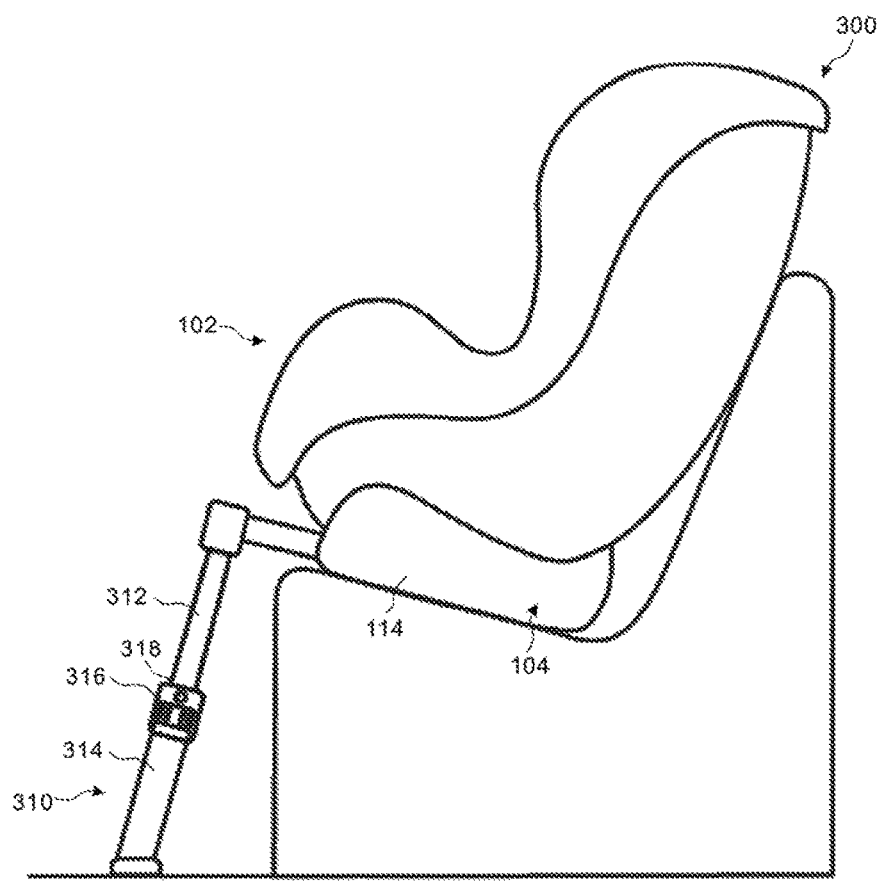
FIGS. 16 and 17 are schematic views illustrating another embodiment of a child safety seat assembly.
Figure 17:
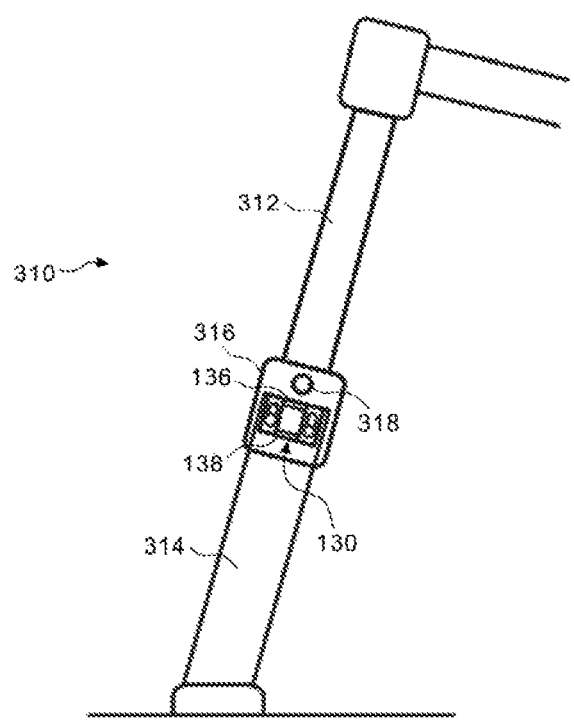

FIGS. 16 and 17 are schematic views illustrating another embodiment of a child safety seat assembly 300. Like previously described, the child safety seat assembly 300 can include the child seat 102 and the support base 104. The support base 104 can further include a retractable leg frame 310 coupled with the shell body 114. The leg frame 310 can be operable to extend from a bottom of the shell body 114. When the child safety seat assembly 300 is placed in a vehicle, the leg frame 310 can be positioned to abut against a floor of the vehicle. The leg frame 310 may prevent flipping of the child safety seat assembly 300 when collision occurs.

In one embodiment, the leg frame 310 can include two tube segments 312 and 134. The tube segment 312 can be respectively affixed with a coupling part 316 and a fastener 318. The tube segment 314 can be fixedly assembled through the coupling part 316. Moreover, the tube segment 314 can further be assembled with the cushion part 130 as described in FIG. 3. The cushion part 130 can be affixed in the interior of the tube segment 314 adjacent to the fastener 318, the sidewall 136 of the cushion part 130 facing the fastener 318.

Figure 18:
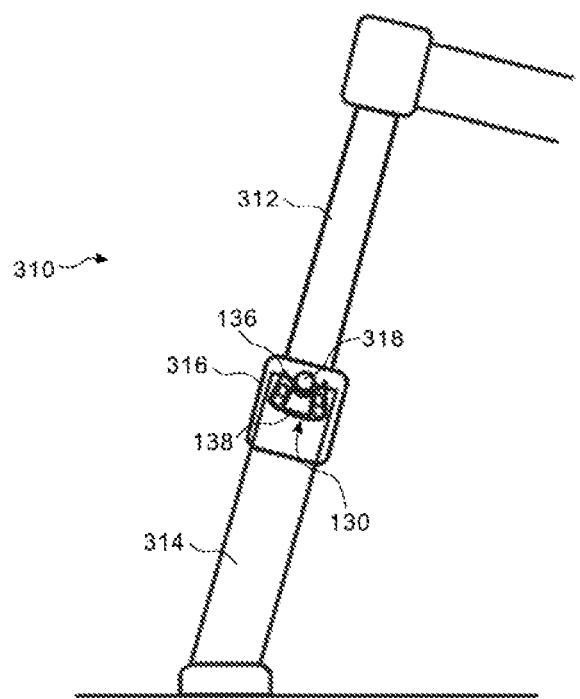
FIG. 18 is a schematic view illustrating a cushioning action of the cushion part in the leg frame shown in FIG. 16.

FIG. 18 is a schematic view illustrating a cushioning action of the cushion part 130 in the leg frame 310. When a vehicle installed with the child safety seat assembly 200 is subject to collision, the two tube segments 312 and 314 may be forced to move relative to each other along the longitudinal axis of the leg frame 310. As a result, the sidewall 136 and the fastener 318 are forced to push against each other, which causes the cushion part 230 to plastically deform and results in a cushioning displacement of the tube segment 312 relative to the tube segment 314. The region where the fastener 318 contacts and pushes against the sidewall 136 can be located at the middle of the hollow body 132 between the two end portions 132A and 132B, and more particularly adjacent to the inward recessed surfaces 144 of the sidewalls 140 and 142. The pressure applied by the fastener 318 can cause the sidewall 136 to bend inward the inner cavity 134 of the hollow body 132, which can dissipate a portion of the collision energy and reduce the risk of injuries to the child sitting on the child safety seat assembly 300.

It is worth noting that the leg frame 310 provided with the cushion part 130 can also be used in combination with any of the structures described in conjunction with FIGS. 1-6, 7-9 and 12-15, so that cushioning capabilities may be provided along different directions.

Advantages of the child safety seat assemblies described herein include the ability to provide cushion parts at different attachment locations of the child safety seat assembly that can effectively dissipate a part of the collision energy when car collision occurs. Accordingly, the risk of child injury may be reduced, and the child safety seat assembly can be safer in use.

Realizations of the child safety seat assemblies have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat assembly comprising:
   a shell body for defining a support base attachable to a child seat;
   a leg frame coupled with the shell body, the leg frame being operable to extend downward from a bottom of the shell body, wherein the leg frame includes a first and a second tube segment attached with each other, the first tube segment being further affixed with a fastener; and
   a cushion part affixed in the second tube segment adjacent to the fastener, wherein the cushion part is formed as an integral hollow body including a first, a second and a third sidewall, the first sidewall facing the fastener, and the second and third sidewalls respectively including inward recessed surfaces and being respectively connected with two side edges of the first sidewall;
   wherein the fastener and the first sidewall push against each other to cause deformation of the cushion part when the second tube segment and the cushion part are forced to displace in unison relative to the first tube segment and the fastener.

2. The child safety seat assembly according to claim 1, wherein the second and third sidewalls respectively include openings formed through the inward recessed surfaces.

3. The child safety seat assembly according to claim 2, wherein the hollow body includes an inner cavity that extends from a first to a second end portion thereof, the openings formed through the inward recessed surfaces respectively communicating with the inner cavity.

4. The child safety seat assembly according to claim 3, wherein when the second tube segment is forced to displace relative to the first tube segment, the region where the fastener and the first sidewall contact with each other is located at a middle of the hollow body between the first and second end portions.

5. The child safety seat assembly according to claim 1, wherein when the second tube segment is forced to displace relative to the first tube segment, the region where the fastener and the first sidewall contact with each other is located adjacent to the inward recesses surfaces of the second and third sidewalls.

6. The child safety seat assembly according to claim 1, wherein the cushion part is made of a metallic material or plastics material.

7. A child safety seat assembly comprising:
- a shell body;
- a leg frame coupled with the shell body, the leg frame being operable to extend downward from a bottom of the shell body, wherein the leg frame includes a first and a second tube segment attached with each other, the first tube segment being further affixed with a fastener; and
- a cushion part affixed in the second tube segment adjacent to the fastener, wherein the cushion part is formed as an integral hollow body having an inner cavity, the hollow body including two opposite end portions, and a first, a second and a third sidewall respectively extending between the two end portions, the first sidewall facing the fastener, and the second and third sidewalls respectively including inward recessed surfaces and being respectively connected with two side edges of the first sidewall;
- wherein the fastener and the first sidewall push against each other to cause bending deformation of the first sidewall toward the inner cavity when the second tube segment and the cushion part are forced to displace in unison relative to the first tube segment and the fastener.

8. The child safety seat according to claim 7, wherein the inner cavity extends from one of the two end portions to the other end portion.

9. The child safety seat according to claim 7, wherein the second and third sidewalls respectively include openings formed through the inward recessed surfaces.

10. The child safety seat according to claim 9, wherein the openings formed through the inward recessed surfaces respectively communicate with the inner cavity.

11. The child safety seat according to claim 9, wherein when the second tube segment is forced to displace relative to the first tube segment, the region where the fastener and the first sidewall contact with each other is located adjacent to the openings formed through the inward recessed surfaces of the second and third sidewalls.

12. The child safety seat according to claim 7, wherein the cushion part is made of a metallic material or plastics material.

* * * * *